United States Patent [19]

Suh et al.

[11] 4,035,550

[45] July 12, 1977

[54] FIBER REINFORCED COMPOSITE OF HIGH FRACTURE TOUGHNESS

[75] Inventors: Nam P. Suh, Sudbury; Terence J. Jones, Medford; Nak-Ho Sung, Needham, all of Mass.

[73] Assignee: Massachusetts Institute of Technology, Cambridge, Mass.

[21] Appl. No.: 535,358

[22] Filed: Dec. 23, 1974

[51] Int. Cl.² ...................... B32B 9/00; D02G 3/00
[52] U.S. Cl. .............................. 428/339; 260/37 R; 260/37 SB; 260/37 N; 260/37 EP; 260/38; 260/39 R; 260/40 R; 260/42.14; 260/42.15; 260/42.18; 260/857 R; 260/9; 427/387; 428/335; 428/336; 428/375; 428/378; 428/443; 428/391; 428/394; 428/395; 428/429; 428/447; 428/448; 428/451; 428/497

[58] Field of Search .......... 428/391, 339, 378, 375, 428/297, 335, 302, 336, 429, 497, 394, 388, 443, 395, 447, 448, 451; 260/42.18, 37 R, 42.15, 42.14, 40 R, 37 N, 37 EP, 39 R, 38, 37 SB, 9, 857; 427/387

[56] References Cited

U.S. PATENT DOCUMENTS

| 2,392,805 | 1/1946 | Biefeld | 428/378 |
| 2,723,215 | 11/1955 | Biefeld | 428/378 |
| 2,758,951 | 8/1956 | Case | 428/302 |
| 3,423,235 | 1/1969 | Campbell | 428/391 |
| 3,425,895 | 2/1969 | Mertzweiller | 260/75 T |
| 3,634,236 | 1/1972 | Buster | 428/391 |
| 3,853,607 | 12/1974 | Iyengar | 428/391 |
| 3,924,047 | 12/1975 | Ward | 428/378 |

OTHER PUBLICATIONS

Martson, et al., Journal of Mat. Sci., 9, 447–455 (1974).
Atkins, Journal of Mat. Sci., 10, 819–832 (1975).

*Primary Examiner*—Ellis Robinson
*Attorney, Agent, or Firm*—Arthur A. Smith, Jr.; Robert L. Goldberg

[57] ABSTRACT

This invention relates to fiber reinforced plastic composites, and more particularly, composites having substantially improved fracture toughness at high speed loading. In accordance with this invention, the fracture toughness of a composite is substantially improved by the use of an internal energy damping mechanism which is dependent upon the rate of loading. This energy damping mechanism comprises fibers dispersed through the composite pre-coated with a viscous fluid. Upon impact, substantial energy is dissipated at the fiber-matrix interface due to shear deformation of the coated viscous layer.

21 Claims, 2 Drawing Figures

FIBER REINFORCED COMPOSITE OF HIGH FRACTURE TOUGHNESS

The invention herein described was made in the course of work performed under a grant from the National Science Foundation.

BACKGROUND OF THE INVENTION

Introduction

This invention relates to fiber reinforced plastic composites and more particularly, to fiber reinforced plastic composites characterized by improved fracture toughness.

Description of the Prior Art

Glassy plastics are limited in their use in their engineering and industrial applications by low fracture toughness or poor resistance to brittle fracture. The fracture toughness of a material is the amount of energy required for fracture to occur across a unit cross-section during loading and represents the ability of materials to withstand impact loading without complete separation of materials.

To improve the fracture toughness, glassy polymers have been either modified with rubber or reinforced with fibrous materials. In rubber modified glassy polymers, toughening is due to large energy absorption caused by the rubber phase in creating large amount of crazes and microcracks in a matrix during impact loading. The use of rubber modified glassy polymers is taught, for example, in British Pat. No. 1,105,634. The increase in toughness is, however, at the expense of stiffness, the addition of the rubber resulting in a decrease thereof.

With fiber reinforced plastics, it is known that fracture energy originates from the combined effect of (1) the work necessary to overcome friction in pulling out fibers from the matrix material [A. Kelly (1970), Proc. Roy. Soc. A31P, 95, and A. H. Cotrell, Proc. Roy. Soc. A282,2], (2) the work of creating new surfaces by fiber/matrix debonding [J. O. Outwater et al, 24th Annual Conf. on Reinf. Plast/Composites Div. of SPI, paper 11c, 1969], (3) the flexural energy absorbed up to failure [N. L. Hancox (1971), Composites 3, 41] and (4) the work done in plastic deformation of the matrix materials [M. R. Piggott (1970) J. Mat. Sci. 5, 669]. Of the above mechanisms, the fiber pull-out work necessary to overcome friction is known to be dominant in increasing fracture toughness of the fiber reinforced composite.

The aforesaid energy absorbing mechanisms are effective normally at a relatively slow rate of loading. Under very high speed loading, a fiber reinforced composite is often quite brittle and thus does not find use in many high speed impact applications.

If bond strength is greater than the tensile strength of fibers (where fiber aspect ratio is larger than the critical aspect ratio), the fiber fracture will occur with a minimal amount of debonding and fiber pull-out. Because of the limited fiber pull-out work, energy absorption under this condition is small. If bonding strength is less than the strength of the fiber, debonding and fiber pull-out will occur upon loading. Energy dissipation is primarily through the work performed in pulling fibers against frictional forces. Since frictional forces are coulombic in nature, the energy dissipation in this case is independent of the rate of fiber pull-out and the rate of impact loading.

STATEMENT OF THE INVENTION

The objective of this invention is to increase fracture toughness of fiber reinforced composites under impact loading conditions through an energy absorption mechanism which is strain rate sensitive. The mechanism can be made to operate effectively at all speeds of loading. The present invention also provides means of damping out vibratory energy through the internal dissipation of the energy.

In accordance with this invention, a fiber reinforced composite is formed of a plastic and fibers where a portion at least of said fibers is coated with a viscous material. Energy absorption is accomplished by deformation of the viscous fluid at the interface of the fiber and the plastic matrix material. Since the deformation of viscous material is strain rate sensitive, the energy absorption depends on loading rate.

DESCRIPTION OF THE PREFERRED EMBODIMENTS

The present invention is based upon the discovery that by applying a viscous coating to fibers in a known plastic matrix, the fracture toughness of the composite at impact loading is substantially improved. This improvement is a direct result of internal damping and energy absorption provided by the viscous coating on the fiber during deformation. This damping and energy absorption, unlike that provided by the coulomb frictional force during fiber pull-out with conventional prior art fiber reinforced composites, is directly proportional to the rate of the loading.

Figure 1:
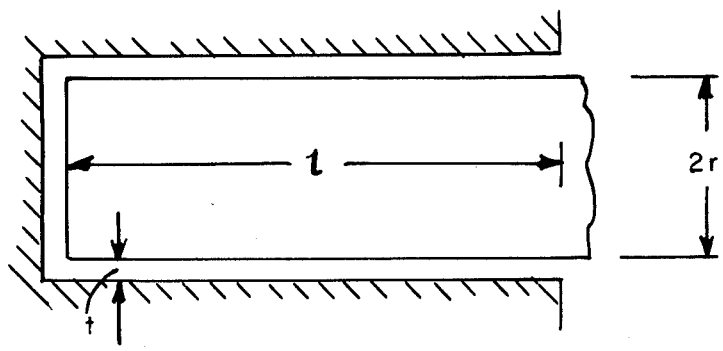
FIG. 1 represents a single fiber coated with a viscous material in a plastic matrix.

Without being limited hereby, a theoretical explanation for such variable internal energy damping can best be understood by an analysis of the forces to which the fiber reinforced composite is subjected upon impact. These forces can essentially be divided into two categories (a) the force resisting fiber pull-out, $F_s$, and (b) the force resisting fiber breakage, $F_b$. With reference to FIG. 1, these forces are represented by equations 1 and 2, respectively:

$$F_s = 2\pi r L \tau \qquad (1)$$

$$F_b = \pi r^2 \sigma \qquad (2)$$

where in the above, $r$ is the radius of a fiber of length $2L$, having a tensile strength of $\sigma$. $\tau$ is the shear stress acting on a fiber coated with a viscous material of coating thickness $t$. Said shear stress is related to the viscosity, $\eta$, of a coated fluid by a first approximation equation 3.

$$\tau = \eta \left(\frac{V}{t}\right)^n \qquad (3)$$

wherein V is the velocity of fiber pull-out, $t$ is the thickness of the fluid coating and $n$, for any given fluid, is the exponent for the power law. For a Newtonian fluid, $n$ is 1. For a nonNewtonian fluid, $n$ is a number other than 1 and can be ascertained from a standard reference source.

From equation 3, it is clear that shear stress, $\tau$, is dependent on the velocity of fiber pull-out, V, and the thickness of coating, $t$, such that the higher velocity and/or the lower the thickness of coating, shear stress will be higher at a given value of viscosity $\eta$. For a given distance of fiber pull-out, the energy absorbed is directly proportional to shear stress, $\tau$, and therefore is dependent on the velocity of pull-out and the coating thickness in the same manner as above.

If $F_s$ is equal to or greater than $F_b$, fibers will break instead of being pulled out and the composite will exhibit brittle fracture. By equating $F_s$ and $F_b$, the critical aspect ratio of fiber is obtained at given conditions of V, $t$, $\eta$ and $\sigma$, and a relationship can be drawn between the optimum thickness of a fluid coating and the viscosity of this coating as follows:

$$t^n = \eta \left( \frac{2LV^n}{r\sigma} \right) \qquad (4)$$

where each symbol is as described above. With this relationship for any given fiber reinforcement of known radius $r$, tensile strength $\sigma$ and length 2L, one can design a composite to withstand a given shear stress by selection of a fluid meeting the requirements set forth herein of viscosity $\eta$ and determine the optimum thickness using relationship (4). The thickness determined by this relationship is optimum because, if the thickness decreases further, the force resisting from fiber pull-out, $F_s$-from equation (1) will exceed the force resisting fiber breakage, $F_b$-from equation (2) and the composite will undergo brittle fracture. Alternatively, if the coating thickness is greater than that determined from relationship (4), the composite will not undergo brittle fracture but its impact resistance will be less because $F_b$ will exceed $F_s$. Consequently, thickness from relationship (4) is both the optimum thickness and the approximate minimum thickness desirable. The plastics that may be fiber reinforced in accordance with this invention, as well as the materials used for fiber reinforcement, are those well known in the art and disclosed in the literature including The Modern Plastics Encyclopedia for 1961, McGraw Hill Publishing Company, New York, N.Y. pp. 628 – 643. Thermoset resins that have been reinforced include the alkyds, diallyl phthalates, epoxies, melamines, the phenolics, polyesters, silicones and polyurethanes. Thermoplastic resins that have been reinforced include high density polyethylene, the ABS resins, thermoplastic polyesters, polystyrene, polyvinyl chloride, FEP fluroplastic, polysulfone, polypropylene, stryrene-acrylonitrile copolymers, polyurethanes, nylons and polyphenylene oxides. Typical reinforcing fibers used with both the thermoplastics and thermosetting resins include glass, graphite, asbestos, sisal, nylon, polyvinyl chlorides and other synthetic and natural fibers. The loading of fiber typically varies from about 0.1 to 35% by volume of the composite, both in the prior art and in accordance with this invention.

The fluids employed in accordance with this invention, as coatings for the fibers, should be viscous relative to water, substantially immiscible and non-reactive with the plastic, the curing agents, if any, and the fiber material. By viscous, it is meant that the fluid should have a viscosity of at least 25 centipoise (cp) preferably, a viscosity of at least 100 cp and most preferably a viscosity in excess of 5,000 cp. The maximum viscosity is not critical, through due to difficulties in coating fibers with high viscosity fluids, it is difficult to use a fluid with a viscosity exceeding 1,000,000 CP and preferably, the viscosity does not exceed 300,000 CP. Examples of typical fluids include mineral oil, various silicone fluids and greases, petroleum jelly, glycerol and the like.

As described above, the viscosity and thickness of the fluid coating are interrelated and depend, to large extent, on the given properties of the composite (i.e., the strength and the aspect ratio of fibers, fiber volume fraction, etc.) and the conditions of impact (i.e., the velocity of impact). As a general guideline only, the coating thickness can vary from 0.001 to 25 mils but typically varies between 0.1 and 10 mils.

The method of coating the fiber includes those coating methods well known in the prior art. Such coating techniques including drawing a fiber through the viscous fluid and adjusting the thickness of the coating by the removal of the excess fluid such as by drawing the coated fiber through a die of desired diameter. Once the fiber is coated, the composite is formed, following methods standard in the prior art such as the application of heat and pressure.

This invention can be best understood by reference to the following illustrative examples.

EXAMPLE 1 – 9

Fiber reinforced composites were prepared using a polyester matrix and E-glass fiber yarn. Three-plied E-glass yarn, having strands containing 204 filaments, was pre-coated with various viscous materials and drawn through a glass die to adjust the thickness of the coating and was wrapped around a 9 × 14 inch frame. Four of these frames were stacked together such that fibers are uniaxially oriented and laminac 4155 polyester resin (American Cyanamic Co.) was poured in. After vacuum removal of entrapped gases, composite was cured at room temperature and subsequently post cured for one hour at 170°. The fiber volume in the composite prepared was 0.06. Standard notched impact specimens were prepared and tested on a Izod impact tester according to ASTM D256.

| Example | Coating | Viscosity (cp) | Amount of Coating (g/in of fiber) | Energy Absorbed (ft/lb.notch) |
|---|---|---|---|---|
| 1 | none | — | — | 3.2 |
| 2 | Zelex NE[1] | 125,000 | $2.78 \times 10^{-4}$ | 5.20 |
| 3 | Silicone grease | 100,000 | $10 \times 10^{-4}$ | 3.40 |
| 4 | '' | 100,000 | $7 \times 10^{-4}$ | 4.48 |
| 5 | '' | 100,000 | $5.5 \times 10^{-4}$ | 5.12 |
| 6 | '' | 100,000 | $4.0 \times 10^{-4}$ | 5.48 |
| 7 | '' | 100,000 | $3.3 \times 10^{-4}$ | 8.0 |
| 8 | '' | 100,000 | $3.0 \times 10^{-4}$ | 8.32 |
| 9 | vasoline | 60,000 | $3.4 \times 10^{-4}$ | 5.62 |

[1]a phosphate mold release compound

Figure 2:
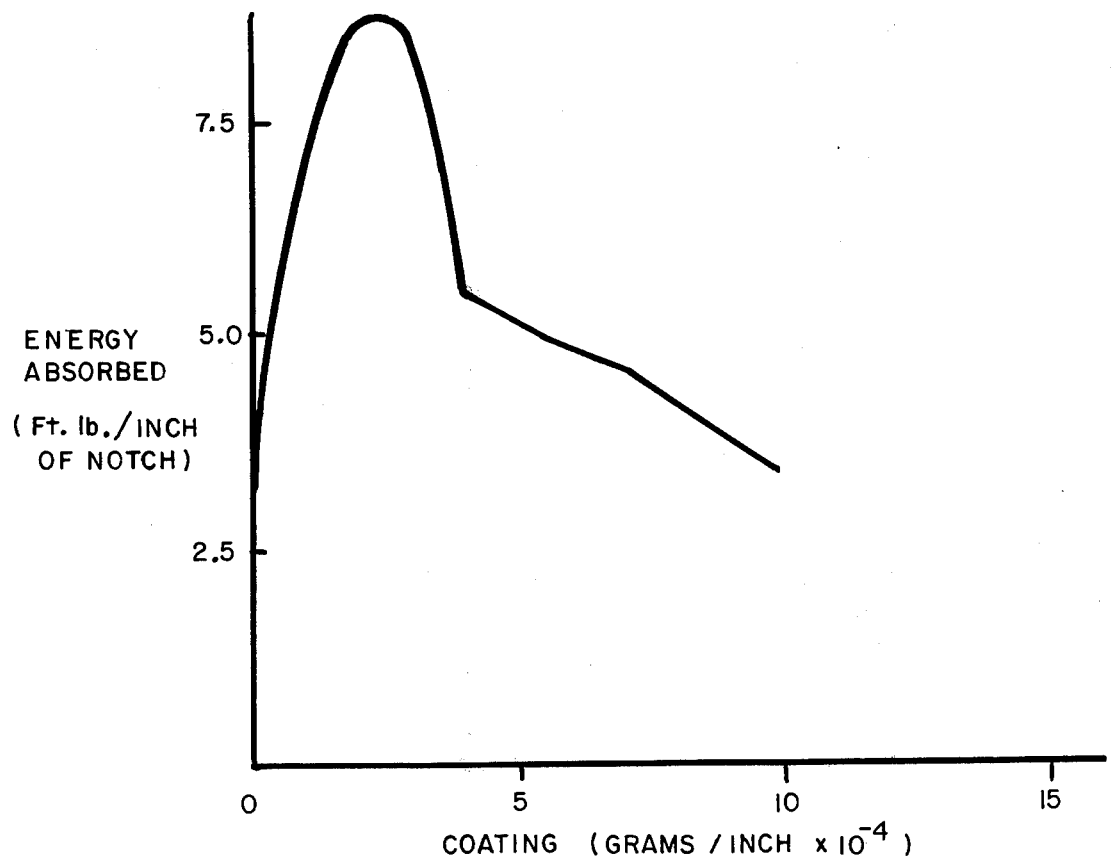
FIG. 2 represents energy absorbed as a function of coating thickness in a polyester/E-glass composite.

The results of Examples 3 to 8 are graphically depicted in FIG. 2 of the drawings.

We claim:
1. An article of manufacture comprising a solid plastic composite having fibers dispersed therethrough, a portion at least of said fibers being coated with a fluid having a viscosity of at least 25 CPS, said coating being of a thickness sufficient to increase the impact resistance of said plastic composite and said fluid being substantially immiscible and nonreactive with the plastic of said matrix, curing agents for said plastic and the material of said fibers.

2. The article of claim 1 where essentially all fibers are coated with inert fluid.

3. The article of claim 1 where the plastic is a thermoplastic selected from the group of polyethylene, acrylonitrilebutadiene-styrene copolymers, polyesters, polystyrene, polyvinyl chlorides, fluoroplastics, polysulfones, polypropylene, styrene acrylonitrile copolymers, polyurethanes, nylons and polyphenylene oxides.

4. The article of claim 1 where the plastic is a thermoset resin selected from the group of diallyl phthalates, epoxies, melamines, phenolics, polyesters, silicones and polyurethanes.

5. The article of claim 1 where the fibers are selected from the group of glass, asbestos, sisal, nylon, graphite, and polyvinyl chloride.

6. The article of claim 1 where the viscosity ranges between 100 and 1,000,000 centipoise.

7. The article of claim 1 where the viscosity range is between 5,000 and 250,000 centipoise.

8. The article of claim 1 where coating thickness of the inert fluid coating over the fiber is determined by the relationship $$t^n = \eta \left( \frac{2LV^n}{r\sigma} \right)$$

where $t$ is the coating thickness, $\eta$ is the viscosity of the inert fluid, 2L is the length of fiber, V is the velocity of fiber pull-out from the matrix, $r$ is the radius of the fiber and $\sigma$ is the tensile strength of the fiber.

9. The article of claim 8 where the thickness of the inert fluid coating over the fiber is equal to or greater than that determined by said relationship.

10. The article of claim 1 where the thickness of the inert fluid coating over the fiber varies between 0.001 and 25 mils.

11. The article of claim 10 where the thickness varies between 0.1 and 10 mils.

12. The article of claim 1 where the fluid is a silicone grease.

13. A method for substantially increasing the impact strength of a fiber reinforced plastic composite, said method comprising coating at least a portion of said fibers with a fluid prior to their incorporation into the plastic matrix of said composition, said coating being of a thickness sufficient to increase the impact resistance of said plastic composite and said fluid having a viscosity of at least 25 CPS and being substantially immiscible and non-reactive with the plastic of said composite, curing agents for said plastic and the material of said fibers.

14. The process of claim 13 where essentially all fibers are coated with inert fluid.

15. The process of claim 13 where the viscosity ranges between 100 and 1,000,000 centipoise.

16. The process of claim 13 where the viscosity range is between 5,000 and 250,000 centipoise.

17. The process of claim 13 where coating thickness of the inert fluid coating over the fiber is determined by the relationship $$t^n = \eta \left( \frac{2LV^n}{r\sigma} \right)$$

where $t$ is the coating thickness, $\eta$ is the viscosity of the inert fluid, 2L is the length of fiber, V is the velocity of fiber pull-out from the matrix of said composite, $r$ is the radius of the fiber and $\sigma$ is the tensile strength of the fiber.

18. The process of claim 13 where the thickness of the inert fluid coating over the fiber is equal to or greater than that determined by said relationship.

19. The process of claim 13 where the thickness of the inert fluid coating over the fiber varies between 0.001 and 25 mils.

20. The process of claim 19 where the thickness varies between 0.1 and 10 mils.

21. The process of claim 13 where the fluid is a silicone grease.

* * * * *